US010462594B2

(12) United States Patent
Lee et al.

(10) Patent No.: US 10,462,594 B2
(45) Date of Patent: *Oct. 29, 2019

(54) AUDIO CONTENT PLAYBACK METHOD AND APPARATUS FOR PORTABLE TERMINAL

(71) Applicant: Samsung Electronics Co., Ltd., Gyeonggi-do (KR)

(72) Inventors: Jung-Mi Lee, Gyeonggi-do (KR); Kyu-Ok Choi, Seoul (KR); Ji-Hyun Um, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 263 days.

This patent is subject to a terminal disclaimer.

(21) Appl. No.: 15/581,051

(22) Filed: Apr. 28, 2017

(65) Prior Publication Data

US 2017/0230775 A1    Aug. 10, 2017

Related U.S. Application Data

(63) Continuation of application No. 14/149,156, filed on Jan. 7, 2014, now Pat. No. 9,654,877.

(30) Foreign Application Priority Data

Jan. 7, 2013    (KR) .................. 10-2013-0001429

(51) Int. Cl.
*H04N 21/43*    (2011.01)
*H04R 3/12*    (2006.01)
(Continued)

(52) U.S. Cl.
CPC .............. *H04S 7/30* (2013.01); *G06F 3/0482* (2013.01); *G06F 3/04886* (2013.01);
(Continued)

(58) Field of Classification Search
CPC .............. G06F 3/0482; G06F 3/04886; H04M 1/7253; H04N 21/4307; H04N 21/4788; H04R 3/12; H04R 5/04; H04S 7/30
(Continued)

(56) References Cited

U.S. PATENT DOCUMENTS

2001/0041588 A1    11/2001    Hollstrom et al.
2002/0059585 A1*   5/2002     Maeda .................... H04N 5/38
                                                    725/34
(Continued)

FOREIGN PATENT DOCUMENTS

CN            1402931 A       3/2003
CN            101466162 A     6/2009
(Continued)

OTHER PUBLICATIONS

Chinese Search Report dated Jun. 25, 2018.
(Continued)

*Primary Examiner* — Vivian C Chin
*Assistant Examiner* — Friedrich Fahnert
(74) *Attorney, Agent, or Firm* — Cha & Reiter, LLC.

(57) ABSTRACT

An audio content playback method for a portable terminal. The audio content playback method includes checking a channel that is supportable by audio content that is currently engaged in group's simultaneous playback, in group's simultaneous playback of the audio content. The method includes allocating a channel to each of devices included in a group based on position information of each device included in the group or based on an input state in a user interface environment that is preset for channel allocation for each device included in the group, and transmitting the allocated channel information to each device included in the group to allow the device to select its allocated channel and play the audio content.

20 Claims, 9 Drawing Sheets

(51) Int. Cl.
*H04N 21/4788* (2011.01)
*G06F 3/0482* (2013.01)
*H04R 5/04* (2006.01)
*H04S 7/00* (2006.01)
*H04M 1/725* (2006.01)
*G06F 3/0488* (2013.01)

(52) U.S. Cl.
CPC ...... *H04M 1/7253* (2013.01); *H04N 21/4307* (2013.01); *H04N 21/4788* (2013.01); *H04R 3/12* (2013.01); *H04R 5/04* (2013.01)

(58) Field of Classification Search
USPC .... 381/1, 2, 14, 23, 59, 77, 79, 80, 81, 122, 381/300, 307, 311; 700/94; 715/716; 455/41.1, 41.3
See application file for complete search history.

(56) References Cited

U.S. PATENT DOCUMENTS

| | | | |
|---|---|---|---|
| 2008/0010255 | A1 | 1/2008 | Lee et al. |
| 2009/0028359 | A1* | 1/2009 | Terada ............ H04S 7/00 381/119 |
| 2009/0177966 | A1 | 7/2009 | Chaudhri |
| 2009/0270093 | A1 | 10/2009 | Lee |
| 2010/0246830 | A1* | 9/2010 | Terada ............ H04L 12/423 381/2 |
| 2012/0087503 | A1 | 4/2012 | Watson et al. |
| 2012/0180136 | A1 | 7/2012 | Song et al. |
| 2012/0189140 | A1 | 7/2012 | Hughes |
| 2012/0220223 | A1 | 8/2012 | Rose et al. |
| 2013/0132074 | A1 | 5/2013 | Kim |

FOREIGN PATENT DOCUMENTS

| | | |
|---|---|---|
| CN | 102693255 A | 9/2012 |
| EP | 1 104 968 A1 | 6/2001 |
| KR | 10-2005-0049820 A | 5/2005 |
| KR | 10-2008-0005038 A | 1/2008 |
| KR | 10-2008-0034253 A | 4/2008 |
| KR | 10-2009-0061287 A | 6/2009 |
| KR | 10-0991264 B1 | 10/2010 |
| KR | 10-2012-0079749 A | 7/2012 |

OTHER PUBLICATIONS

Chinese Search Report dated Oct. 19, 2017.
European Search Report dated Mar. 4, 2019.
Korean Search Report dated Apr. 19, 2019.

* cited by examiner

AUDIO CONTENT PLAYBACK METHOD AND APPARATUS FOR PORTABLE TERMINAL

CROSS REFERENCE TO RELATED APPLICATIONS

This application is a Continuation of U.S. patent application Ser. No. 14/149,156 filed on Jan. 7, 2014 which claims priority under 35 U.S.C. § 119(a) from Korean Patent Application Serial No. 10-2013-0001429, which was filed in the Korean Intellectual Property Office on Jan. 7, 2013, the entire disclosure of which is hereby incorporated by reference.

BACKGROUND

Field of the Invention

The present disclosure generally relates to playback of audio contents (for example, music files) of a portable terminal. More particularly, the present invention relates to a method and apparatus in which multiple portable terminals share single audio content and perform group's simultaneous playback.

Description of the Related Art

Recently, electronic devices such as portable terminals are manufactured to allow users to carry them around. Such portable terminals are sometimes embodied as smart phones, cellular phones, Portable Multimedia Players (PMPs), MP3 players, personal navigating devices, and portable game consoles, and have provided functions of other terminals as well as their own basic functions. In the case of cellular phones as representative examples, various multimedia functions such as a TV viewing function, a music playback function, and a photographing function are provided in addition to general communication functions such as voice communication or message transmission/reception.

Recently, for communication between portable terminals or communication between a portable terminal and another device such as a headset, portable terminals are now often equipped with modules for performing a short-range communication function by using a short-range communication scheme such as WiFi Direct, Near-Field Communication (NFC), or Bluetooth. The portable terminals, which are equipped with such short-range communication modules, are constructed to perform content sharing or interworking therebetween in a relatively short distance.

In particular, among the aforementioned functions, a function of transmitting audio content (for example, an MP3 music file) stored in a portable terminal to its adjacent portable terminal through NFC for sharing and playback of the audio content has been proposed. An example of this conventional technique is disclosed in a Korean Patent Application No. 10-2011-0002310 filed by the present applicant on Jan. 10, 2011, invented by Ji-Hwan Song, and titled "Contents Management Method and Apparatus of Mobile Terminal".

However, the aforementioned conventional technique merely provides a basic function of forming a group of adjacent devices and sharing and playing audio content, and up to now, there is no scheme for providing group's simultaneous playback which is specialized or optimized for audio content.

The above information is presented as background information only to assist with an understanding of the present disclosure. No determination has been made, and no assertion is made, as to whether any of the above might be applicable as prior art with regard to the present invention.

SUMMARY

The present invention has been made to provide an audio content playback method and apparatus for a portable terminal to provide group's simultaneous playback specialized or optimized for audio content.

Aspects of the present invention also provide an audio content playback method and apparatus for a portable terminal to selectively play audio content depending on various schemes, thus providing users with pleasure in audio listening heretofore unknown.

According to an aspect of the present invention, there is provided an audio content playback method for a portable terminal, the audio content playback method may include checking a channel that is supportable by audio content that is currently engaged in a group's simultaneous playback, in the group's simultaneous playback of the audio content, allocating a channel to each of devices included in the group based on position information of each device included in the group or based on an input state in a user interface environment that is preset for channel allocation for each device included in the group, and transmitting the allocated channel information to each device included in the group to allow the device to select its allocated channel and play the audio content.

The user interface environment that is preset for channel allocation for each device included in the group may include, for example, menu selection items provided in advance to receive user's selection of a channel allocation scheme corresponding to the supportable channel of the audio content and sub-menu selection items for selecting a channel for each device included in the group based on the supportable channel of the audio content.

The menu selection items provided in advance to receive user's selection of a channel allocation scheme corresponding to the supportable channel of the audio content may be displayed on a channel allocation main screen that is provided in advance for each channel allocation scheme corresponding to the supportable channel of the audio content, and on the channel allocation main screen may be displayed by touch key input items provided in advance for each channel allocation scheme corresponding to the supportable channel of the audio content, and touch key input items for checking a list of the devices included in the group and channel allocation states of the devices included in the group.

On the channel allocation main screen, there may be further displayed touch key input items provided in advance for each channel as at least a part of the sub-menu selection items for selecting a channel for each device included in the group based on the supportable channel of the audio content.

As a sub-menu of the touch key input item provided in advance for each channel, a list of the devices included in the group and channel allocation states of the devices may be displayed as touch key input items.

On the channel allocation main screen may be further displayed a touch key input item provided in advance for automatic channel allocation.

Other aspects, advantages, and salient features of the invention will become apparent to those skilled in the art from the following detailed description, which, taken in conjunction with the annexed drawings, discloses various embodiments of the invention.

BRIEF DESCRIPTION OF THE DRAWINGS

The above and other aspects, features and advantages of various embodiments of the present invention will become better appreciated by a person of ordinary skill in the art from the following detailed description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist a person of ordinary skill in the art with a comprehensive understanding of various embodiments of the invention as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness when their inclusion could obscure an artisan's appreciation of the present invention.

The terms and words used in the following description and claims are not limited to the bibliographical meanings, but, are merely used by the inventor to enable a clear and consistent understanding of the invention. Accordingly, it should be understood by those skilled in the art that the following description of various embodiments of the present invention is provided for illustrative purposes only and the claimed invention is not limited by the various embodiments shown and described herein. It is to be understood that the singular forms "a," "an," and "the" include plural referents unless the context clearly dictates otherwise. Thus, for example, reference to "a component surface" includes reference to one or more of such surfaces.

Figure 1:
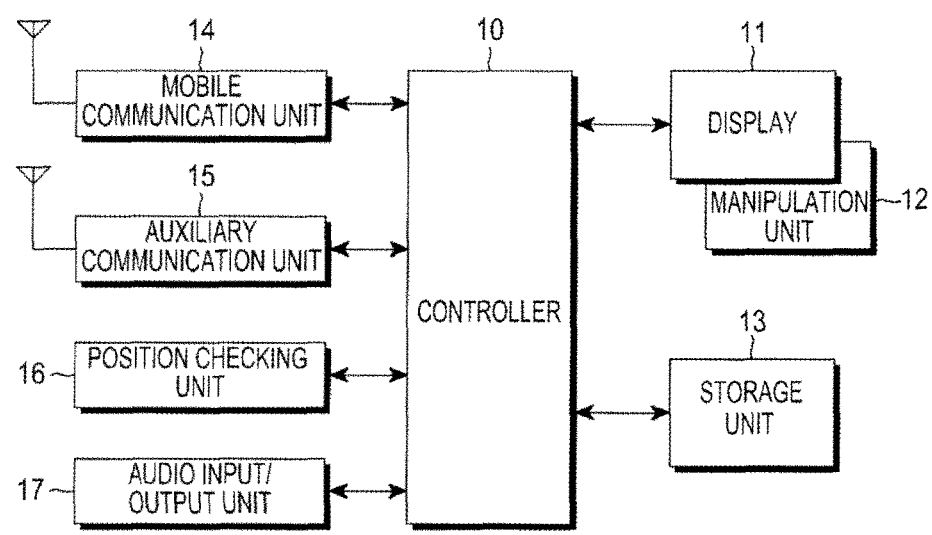
FIG. 1 is a schematic block diagram illustrating a portable terminal which performs audio content playback according to an embodiment of the present invention.

FIG. 1 is a schematic block diagram illustrating an electronic device which performs an audio content playback operation according to an embodiment of the present invention, in which for example, an audio content playback apparatus is a mobile communication terminal. As illustrated in FIG. 1, the audio content playback apparatus according to the present invention includes a controller 10, a display 11, a manipulation unit 12, a storage unit 13, a mobile communication unit 14, an auxiliary communication unit 15, a position checking unit 16, and an audio input/output unit 16.

The display 11 includes a screen typically constructed of a thin-film technology, and can include, for example, typical Liquid Crystal Display (LCD) or Organic Light Emitting Diode (OLED) (for example, a Passive-Matrix OLED (PMOLED) or an Active-Matrix OLED (AMOLED)) screen, so that the display 11 displays execution images of various application programs of the portable terminal, various operating states of the portable terminal, or menu states of the portable terminal, and may be implemented integrally with a touch screen structure.

The manipulation unit 12 includes hardware such as, for example, a touch pad or touch screen associated with the display 11 and a touch screen controller to receive various touch screen manipulation inputs such as a touch or "near-touch" within a certain detectable distance from the touch screen, a drag, a flick, and multi-touches through a user's hand touch or a touch using an electronic pen, and also includes buttons for multiple operations, which are mechanically provided in a keypad or an outer housing of a corresponding device to receive user's manipulation inputs.

The mobile communication unit 14 performs a wireless signal processing operation for a mobile communication function, and may include an antenna, a Radio Frequency (RF) unit, and a modem. The RF unit includes an RF transmitter for up-converting a frequency of a transmission signal and amplifying the transmitted signal and an RF receiver for low-noise amplifying a received signal and down-converting the frequency of the received signal, or a transceiver. The modem includes a transmitter for encoding and modulating the transmission signal and a receiver for demodulating and decoding the received signal.

The auxiliary communication unit 15 includes a wireless Local Area Network (LAN) processing module or a processing module for short-range communication such as WiFi Direct, Near Field Communication (NFC), or Bluetooth, and may be connected with the wireless Internet or wirelessly perform short-range communication with neighboring devices in a place where a wireless Access Point (AP) is installed. As can be seen in FIG. 1, the auxiliary communication unit also includes a transceiver, or transmitter and receiver for short-range communication.

The position checking unit 16 includes circuitry for determining a position, and can include, for example, a Global Positioning System (GPS) module for checking a local position of the portable terminal and generating location information.

The audio input/output unit 17 includes a speaker, a microphone, and an audio codec for processing an audio signal that is input via the microphone and output through the speaker, such that the audio input/output unit 17 receives a user's voice or other audible input, or outputs audible sound to the user during a phone call based on mobile communication, and outputs processing sound corresponding to various operations or sound corresponding to various digital audio contents or video contents.

The storage unit 13 comprises machine readable non-transitory storage and can store a program memory and data memories for storing various contents, various application programs and related contents, and data related to operation processing. The program memory stores a program comprising machine executable code that is loaded into a processor microprocessor for controlling a general operation of the portable terminal. The storage unit 13 may further store an operation program for audio content playback according to characteristics of the present invention.

The controller 10, which includes circuitry such as a processor or microprocessor configured to control respective functional units that control the overall operation of the portable terminal, and the controller 10 switches and/or controls operations of the portable terminal according to a user input inputted through the manipulation unit 12. According to characteristics of the present invention, the controller 10 performs a group's simultaneous playback operation in an audio content playback operation, and in particular, checks a channel supported by audio content and separately allocates a corresponding channel supported by corresponding audio content for each device of a group automatically according to user's selection or a position of each device in the group. The operations of the controller 10 according to an embodiment of the present invention will be described in more detail herein below.

The portable terminal according to an embodiment of the present invention may be implemented by including the aforementioned components. In addition, the portable terminal may also include basic functional units applied to a typical mobile communication terminal, such as a power supply unit (for example, a charging battery), a GPS unit, a vibration motor, and a motion sensor for detecting a motion state of the portable terminal, just to name a few non-limiting possibilities, and may further include other functional units.

While the portable terminal has been described as the embodiment of the audio content playback apparatus in FIG. 1, the audio content playback apparatus according to the present invention may be a Personal Digital Assistant (PDA) or an MP3 player, and in this case, the audio content playback apparatus may not include the mobile communication unit 14 illustrated in FIG. 1.

Figure 2:
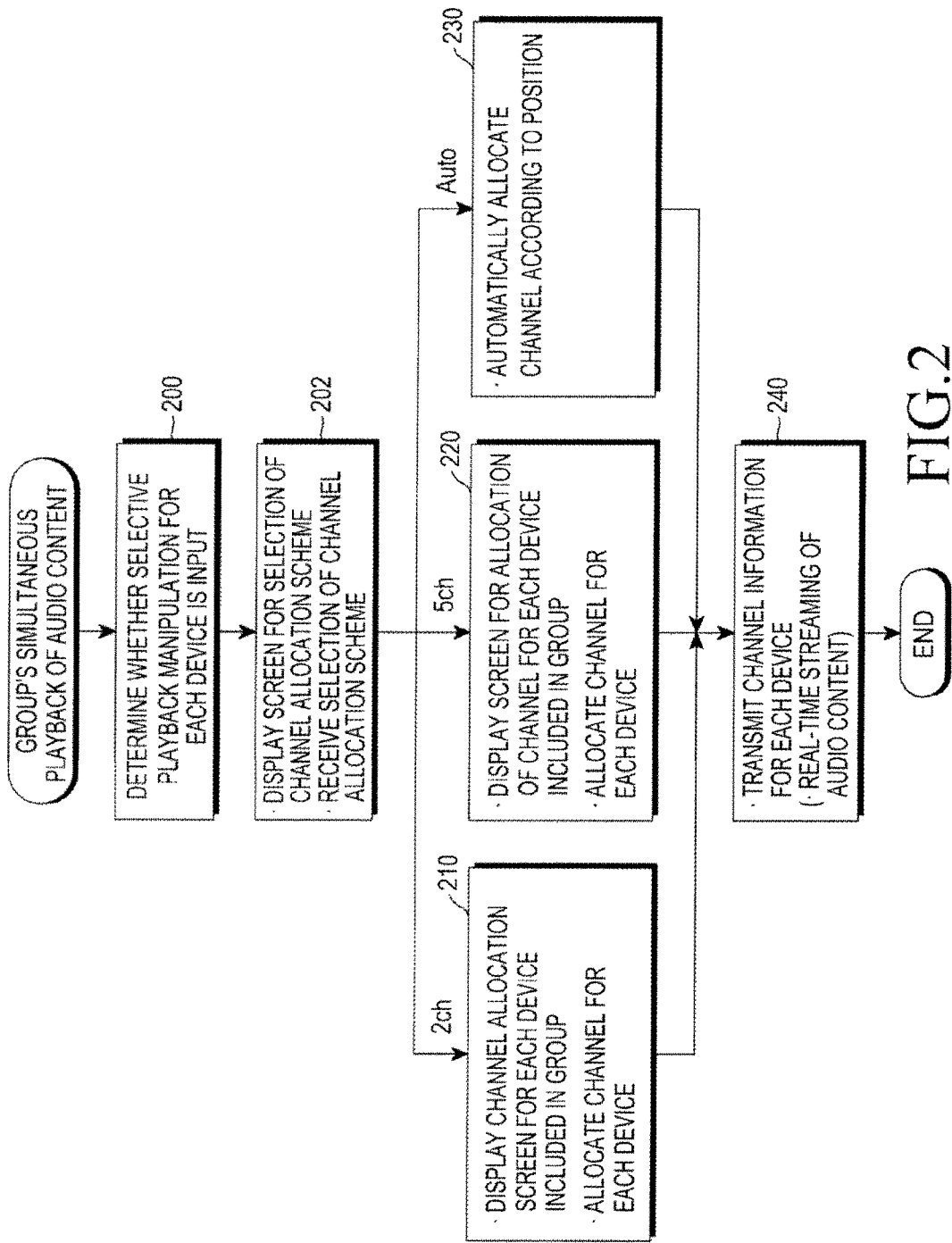
FIG. 2 is a flowchart illustrating operation of audio content playback of a portable terminal according to an embodiment of the present invention.

FIG. 2 is a flowchart illustrating an audio content playback operation of a portable terminal according to an embodiment of the present invention. In FIG. 2, the audio content playback operation may be performed under control of the controller 10 of the portable terminal illustrated in FIG. 1.

Referring now to FIG. 2, the audio content playback operation according to an embodiment of the present invention may be additionally performed during the group's simultaneous playback of audio content or simultaneously with start of group's simultaneous playback.

At operation 200, in order to receive manipulation for selecting whether to perform an operation according to characteristics of the present invention in which a selective channel for each device included in a group is played back, the controller determines whether a selective playback manipulation is input for each device included in the group with respect to menu selection items provided in advance to be displayed on a separate window, or menu selection items provided in advance as touch key input items on a screen. If the controller detects that the manipulation is input, the operation 202 is next performed.

At operation 202, in order to check a channel supportable by audio content currently engaged in group's simultaneous playback and receive a selection of a corresponding channel allocation scheme from the user, a screen including menu selection items for multiple channel allocation schemes, which may be provided in advance as touch key input items, is displayed, and a manipulation of selection of a channel allocation scheme is input from the user on the screen.

At operation 202, the supportable channel of the audio content may be, for example, 2 channels, or 5.1 channels (e.g. Surround Sound) depending on a sound source, such that menu selection items that may be provided in advance as touch key input items for receiving a selection of a channel allocation scheme from the user may be, for example, '2-channel' and '5.1-channel' selection items. In this case, the respective menu selection items may be implemented to be displayed as active/inactive states such that corresponding audio content may be differently indicated by distinguishable colors/shades according to channels supportable by the audio content, allowing the user to easily select a proper item. Also in this case, the sub-menu items for channel selection for each device according to a channel supported by a sound source may be directly displayed. For example, if a sound source supports 2 channels, a menu item for 2-channel selection for each device may be additionally displayed.

Moreover, according to an embodiment of the present invention, an operation of identifying a position of each device in a group and automatically allocating a channel of each device according to the position of the device may be further performed, and the menu selection items of operation 202 may further include, for example, a so-called 'auto channel allocation (Auto)' menu item.

As such, once the supportable channel of the audio content is checked and the corresponding channel allocation scheme is selected in operation 202, then a channel is allocated for each device of the group according to the selected channel allocation scheme in operations 210, 220, and 230.

More specifically, in operation 210, channels for devices are allocated according to the 2-channel allocation scheme, in which a screen including menu input items implemented as, for example, touch key input items, for allocation of one of 2 channels for each device of a group according to user's selection may be displayed and on the screen, channel allocation for each device is input from the user.

However, at operation 220, the channels for devices are allocated according to the 5.1-channel allocation scheme, in which a screen including menu input items implemented as touch key input items for allocation of one of 5.1 channels for each device of the group according to user's selection may be displayed and on the screen, channel allocation for each device is input from the user.

At operation 230, a channel is automatically allocated according to a supportable channel of a sound source, such that the channel is automatically allocated according to a position of each device in the group. For example, if a current sound source supports 2 channels, with respect to a master device which currently provides the sound source and manages channel allocation, a device located at a side may be allocated with a 'left speaker' channel and devices located at the other side may be automatically allocated with 'right speaker' channel. The devices included in the group provide information about their positions (for example, GPS information) to the master device to allow the master device to recognize in advance the positions of the devices included in the group.

Once the channel is allocated for each device in operations 210, 220, and 230, then channel information allocated for each device is transmitted in operation 240. Thus, each device selects its allocated channel and plays corresponding audio content.

Figure 3:
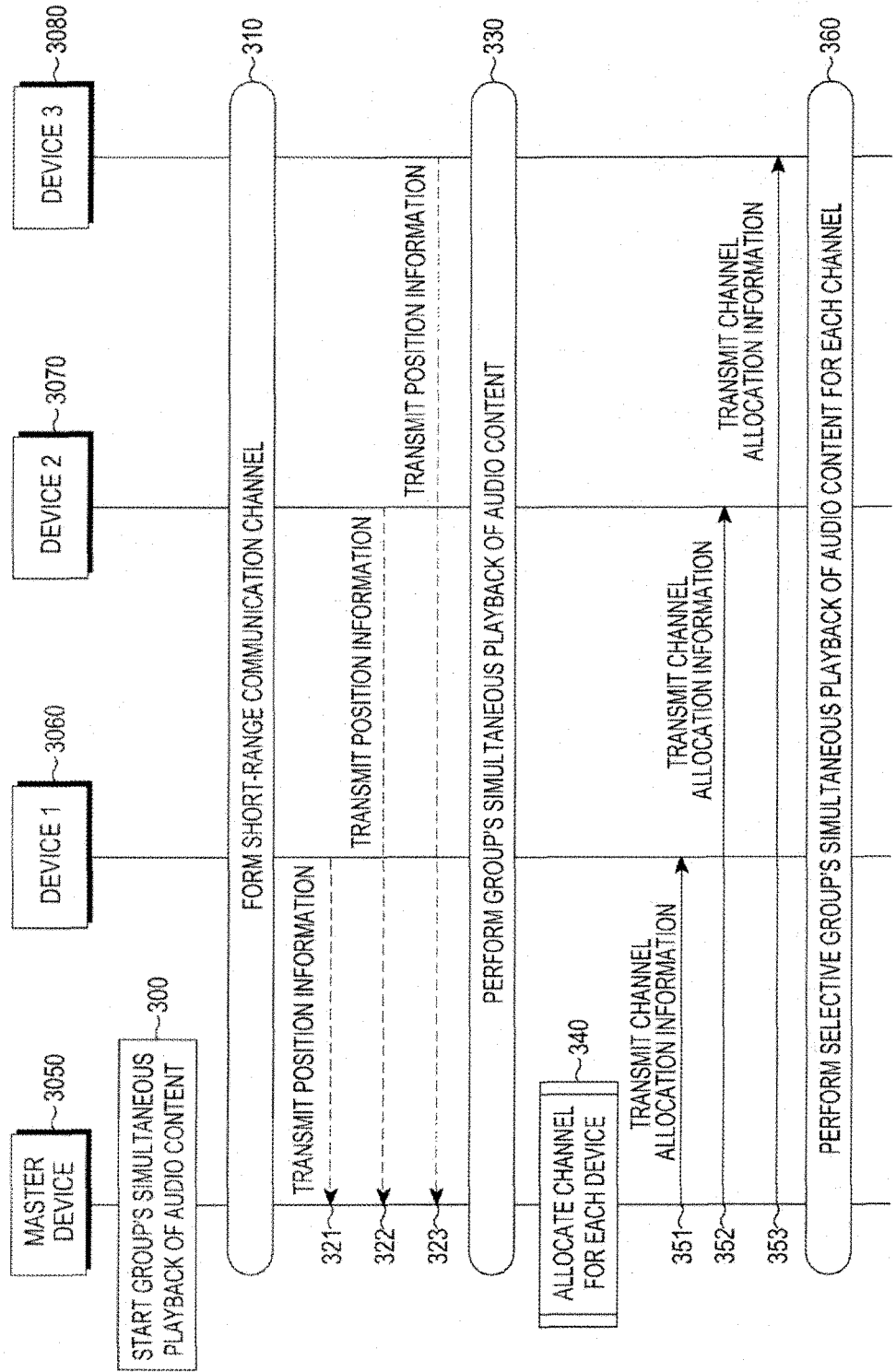
FIG. 3 is a flowchart illustrating operation between devices for audio content playback of a portable terminal according to an embodiment of the present invention.

FIG. 3 is a flowchart illustrating operations between devices for audio content playback of a portable terminal according to an embodiment of the present invention, in which three devices (first through third devices 3060, 3070 and 3080) are connected with respect to a master device 3050 which currently provides a sound source and manages channel allocation.

Referring now to FIG. 3, when the master device starts group's simultaneous playback of audio content in operation 300, a short-range communication channel is formed between the master device and its neighboring first, second and third devices 3060, 3070 and 3080 in operation 310. The short-range communication channel may use a communication scheme such as Wi-Fi Direct, Near-Field Communication (NFC), or Bluetooth. In this case, the master device 3050 may serve as a mobile Access Point (AP) for connection.

Thereafter, in operations 321, 322, and 323, the neighboring devices (the first through third devices) may transmit their position information to the master device.

In operation 330, group's simultaneous playback of the audio content is performed. In this case, the master device 3050 serving as the mobile AP may provide the audio content to the connected devices in a group cast manner.

In operation 340, the master device 3050 performs channel allocation for each device. Channel allocation for each device in operation 340 may be performed in the same manner as channel allocation for each device illustrated in FIG. 2.

In operations 351, 352, and 353, the master device 3050 transmits channel allocation information to each device 3060, 3070, 3080 included in a group, and in operation 360, selective group's simultaneous playback of audio content for each channel is performed. If the master device 3050 serving as the mobile AP provides the audio content to the connected devices in a group cast manner, the master device 3050 transmits channel allocation information to each device 3060, 3070, 3080 in an NFC tagging scheme, such that each device included in each group is provided with the channel allocation information in the NFC tagging scheme and plays the audio content in a corresponding channel. In this case, among devices included in a group, devices which are not provided with the channel allocation information may play the audio content in a basic stereo manner.

Referring to the operations illustrated in FIG. 3 (and FIG. 2), for example, the master device 3050 serves as the mobile AP and provides the same sound source to other group members which access the same AP in the group cast manner, during which the master device allocates a detailed channel to those other group members. Also in this case, the master device 3050 recognizes positions of the other group members in its vicinities, and properly allocates left/right speakers, or in the case of surround sound, allocates the 5.1 channels to the group members. Such operations according to the present invention allow fine playback of the sound source and provide more various music sharing experiences to users.

FIGS. 4 through 10 are diagrams illustrating display screens in an audio content playback of a portable terminal according to an embodiment of the present invention.

Figure 4:
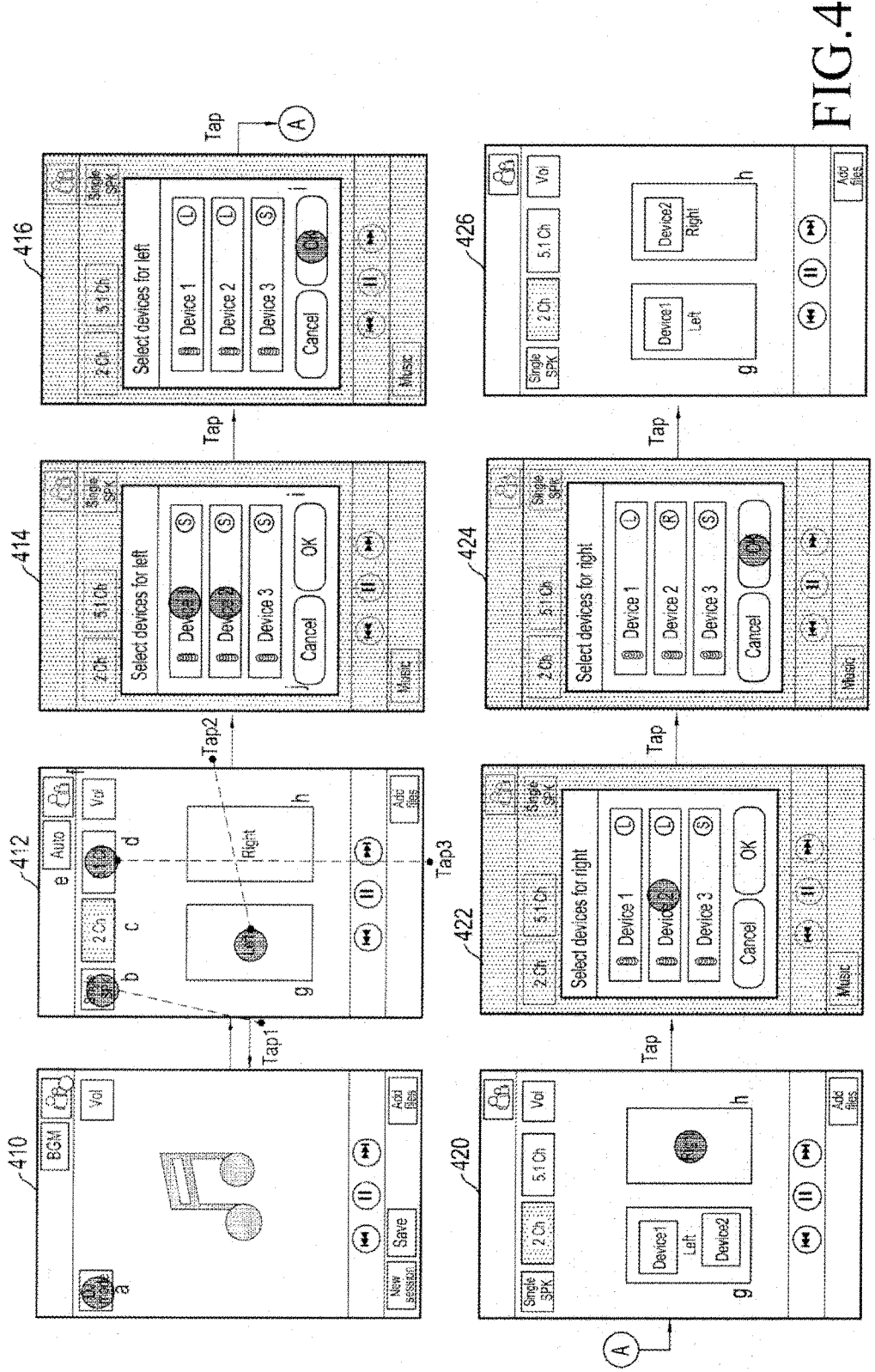
FIG. 4 illustrates examples of user interface screens for channel allocation for each device when a sound source supports 2 channels in audio content playback of a portable terminal according to an embodiment of the present invention.
Figure 5:
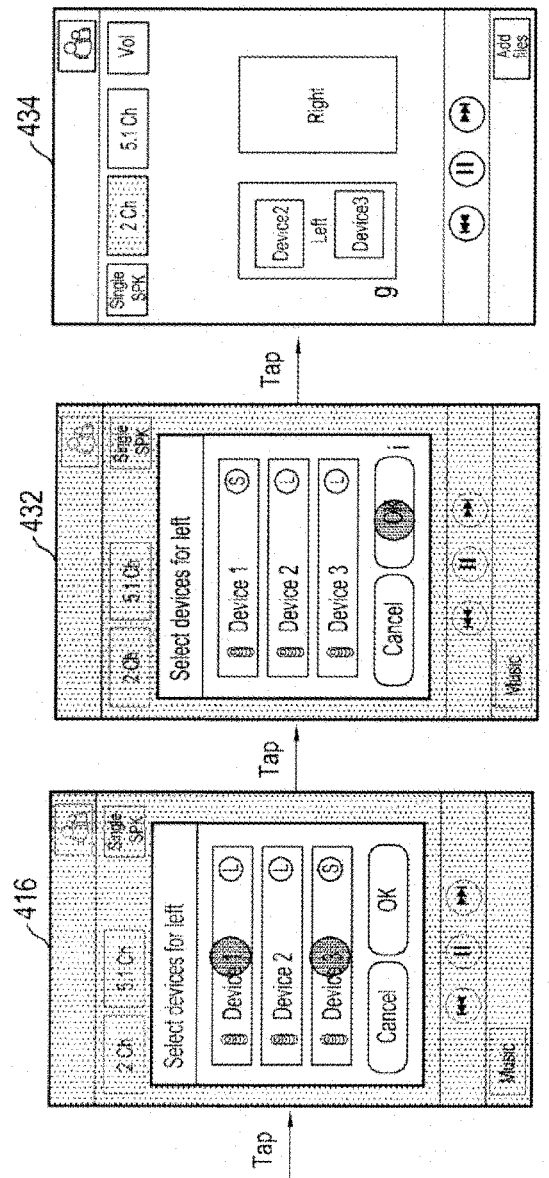
FIG. 5 illustrates display screens in audio content playback of a portable terminal when the channel allocation states of the first and second devices are the left channel states (L) as on the screen of operation 416 illustrated in FIG. 4, according to an embodiment of the present invention.
Figure 6:
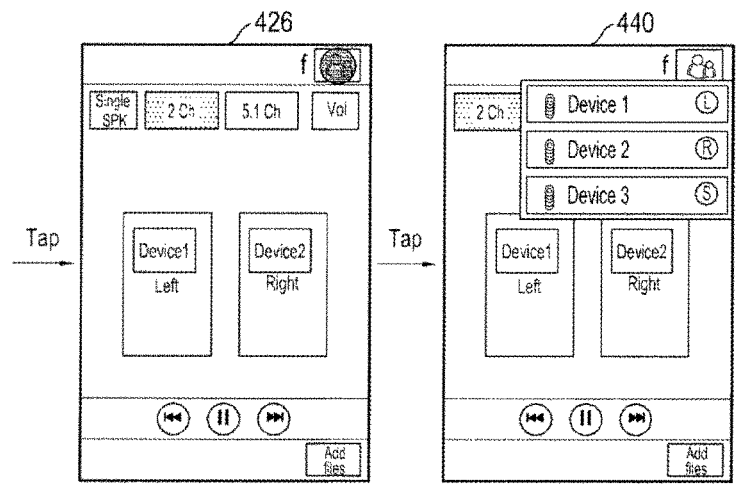
FIG. 6 illustrates a touch input to the touch key input item "f" for checking a list of all the devices included in the current group according to an embodiment of the present invention.
Figure 7:
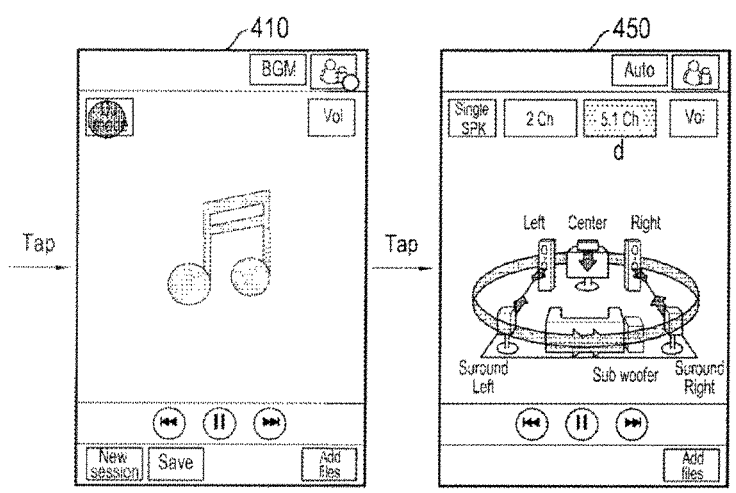
FIG. 7 illustrates screens which are displayed if it is determined that the currently played sound source supports 5.1 channels after input of the touch key input item a provided in advance to perform the per-device channel allocation operation mode according to an embodiment of the present invention.
Figure 8:
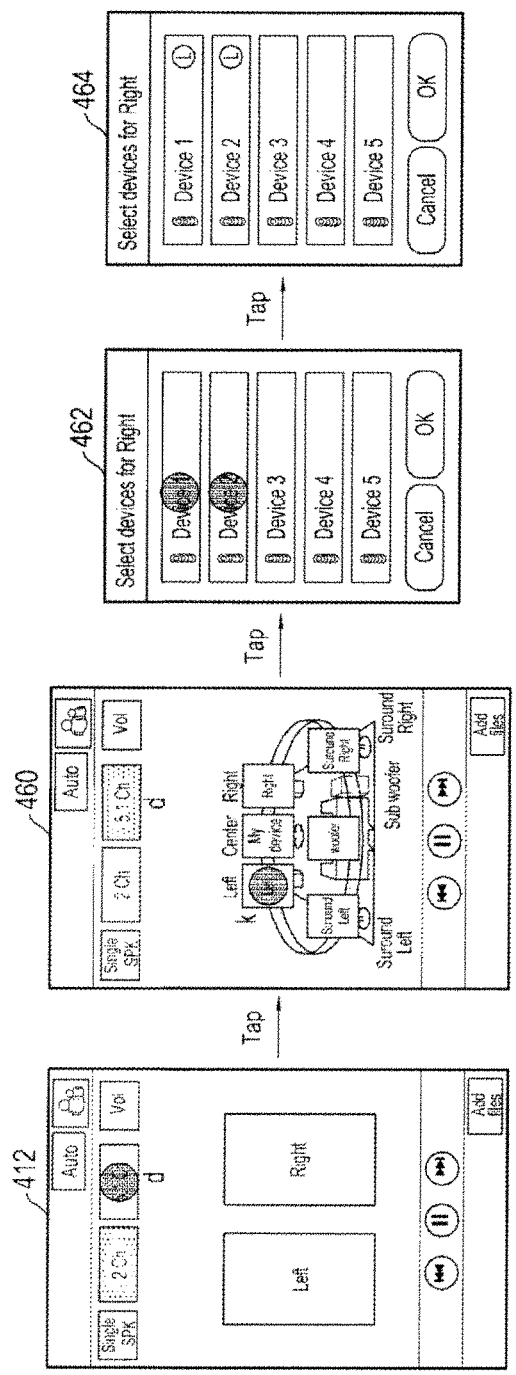
FIG. 8 illustrates a 5.1-channel allocation main screen which is displayed like the screen of operation 450 displayed in case of touch input of the touch key input item d for 5.1-channel allocation provided in advance in the upper portion of the screen of operation 412 illustrated in FIG. 4 according to an embodiment of the present invention.
Figure 9:
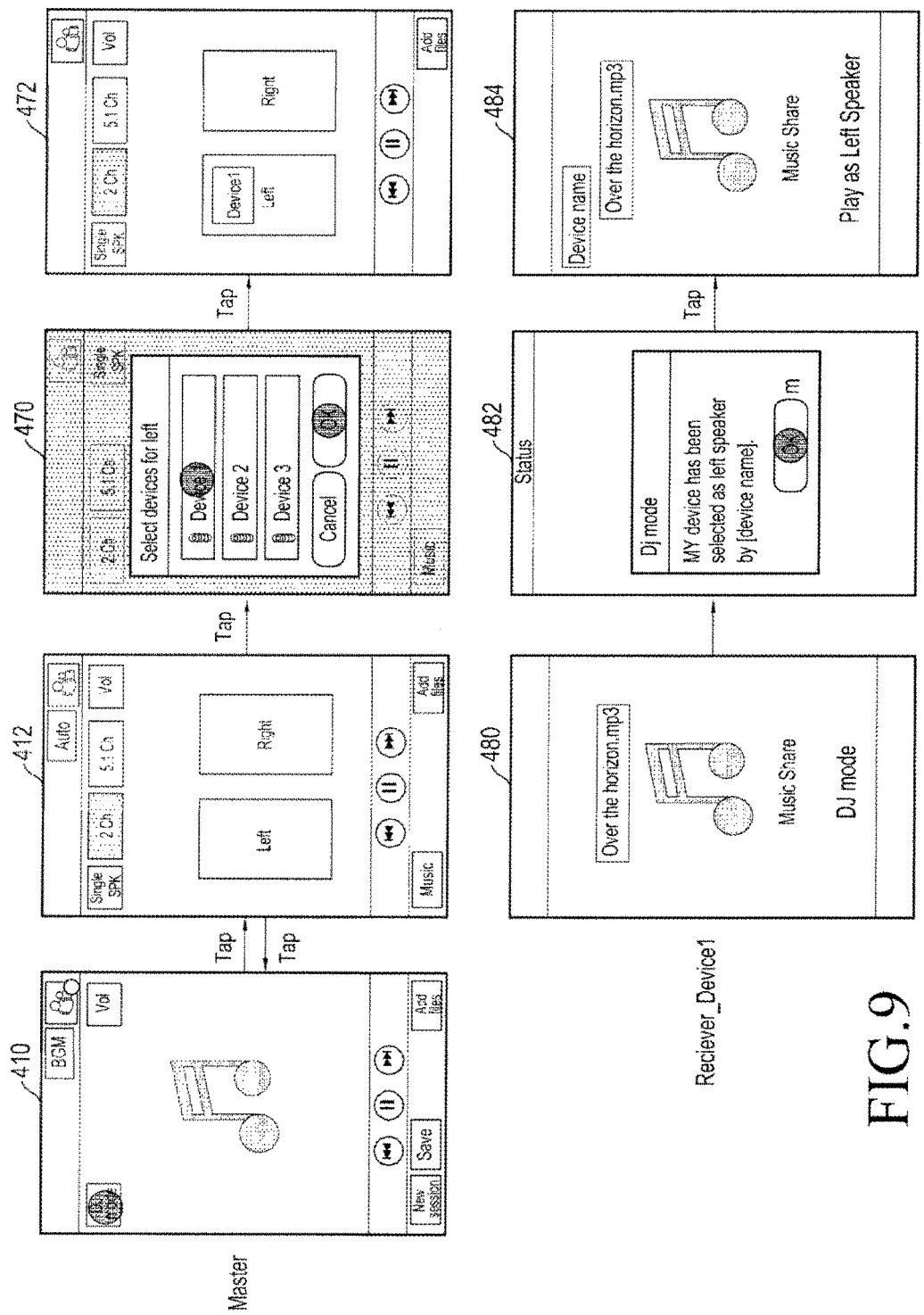
FIG. 9 illustrates comparative examples of user interface screens in a master device and a channel-allocated device of a group according to an embodiment of the present invention.
Figure 10:
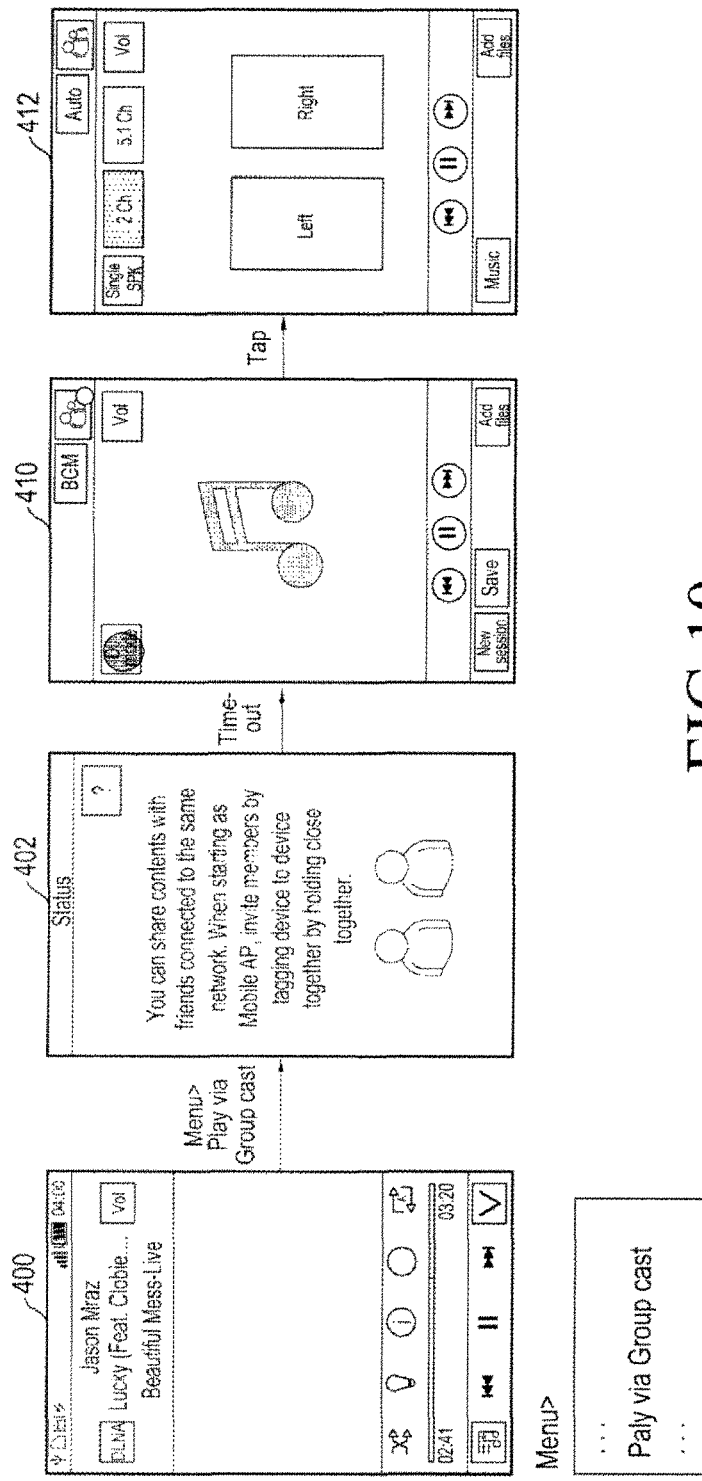
FIG. 10 illustrates examples of user interface screens for initiating group's simultaneous playback during music file playback.

FIG. 4 illustrates examples of user interface screens for channel allocation for each device when a sound source supports 2 channels. FIGS. 5 and 6 illustrate examples of user interface screens in case of modifications or additions with respect to FIG. 4. FIGS. 7 and 8 illustrate examples of user interface screens for channel allocation for each device when a sound source supports 5.1 channels (e.g., surround sound). FIG. 9 illustrates comparative examples of user interface screens in a master device and a channel-allocated device of a group, and FIG. 10 illustrates examples of user interface screens for initiating group's simultaneous playback during music file playback.

First, referring to FIG. 4, a screen of operation 410 is an initial screen in which group's simultaneous playback (for example, a so-called 'music sharing' function) of current audio content is performed.

On the initial screen of operation 410, if the user inputs, for example, a 'tap', a touch key input item "a" is provided in advance to perform a per-device channel allocation operation mode according to characteristics of the present invention, so-called 'DJ mode', a screen of operation 412 is displayed.

The screen of operation 412 is a 2-channel allocation main screen that may be displayed when the controller determines that a currently played sound source supports 2 channels, such as left and right. On the screen of operation 412, a touch key input item "c" provided in advance for 2-channel allocation, so-called '2 channel' is displayed in an active state in an upper portion and touch key input items "g" and "h" for left channel allocation and right channel allocation, so-called 'Left' and 'Right' may be displayed in a center portion. On the screen of operation 412, also in the upper portion, a touch key input item d for 5.1-channel allocation, so-called '5.1 channel', and a touch key input item "e" for automatic channel allocation, so-called 'Auto', may be provided.

In addition, a touch key input item "f" for checking a list of all devices included in a current group (and channel allocation states of all the devices included in the group) may be provided. Moreover, a touch key input item "b" merely performs a music sharing operation without allocating a channel for each device, so-called 'Single SPK' may be provided in advance. If the user inputs ('tap1') the 'Single SPK' touch key input item "b" on the screen of operation 412, per-device channel allocation is stopped to return to the screen of operation 410.

On the screen of operation 412, if the user inputs ('tap 2') the touch key input item "g" for left-channel allocation, a screen of operation 414 may be displayed. On the screen of operation 414, a list of the devices included in the current group (and channel allocation states of the devices) is displayed as channel-selectable touch key input items, such that the user may select a desired device from among the corresponding items to allocate a left channel to that the selected device. On the screen of operation 414, all the devices included in the current group (the first through third devices) are displayed as being currently in a stereo state ('S'). On the screen of operation 414, for example, the first device (Device 1) and the second device (Device 2) are input to the left channel. On the screen of operation 412, touch key input items "i and j" for confirmation and cancellation of channel allocation, so-called 'Ok' and 'Cancel' may be provided.

On a screen of operation 416, channel allocation states of the first and second devices are the left channel states (I') according to user's selection. In this state, the user may input the touch key input item "i" for confirmation of channel allocation. Thus, a screen of operation 420 is displayed.

A screen of operation 420 corresponds to a 2-channel allocation main screen like the screen of operation 412, but within a display region of the left-channel touch key input item "g", icons or items indicating the first and second devices to which the left channel is allocated are provided.

On the screen of operation 420, for example, if the user inputs the touch key input item "h" for right-channel allocation, a screen of operation 422 may be displayed. On the screen of operation 422, a list of devices included in a current group (and channel allocation states of the devices) may be displayed as channel-selectable touch key input items, like on the screen of operation 414, such that the user may select a desired device from among corresponding items to allocate the right channel to the selected device. On the screen of operation 422, among all the devices included in the current group (the first through third devices), the first device and the second device are currently in a left-channel allocated state ('L'). On the screen of operation 422, for example, the (left-channel allocated) second device is input to the right channel again according to user's manipulation.

On a screen of operation 424, the channel allocation state of the second device is changed to the right channel state ('R') according to user's selection. In this state, the user may input the touch key input item i for channel allocation confirmation. Thus, a correspondingly displayed screen of operation 426 is a 2-channel allocation main screen like the screen of operation 412, on which an indication indicating the first device to which the left channel is currently allocated is included in the display region of the left-channel touch key input item g, and an indication indicating the second device to which the right channel is currently allocated is included in the display region of the right channel touch key input item h.

Meanwhile, in FIG. 5, when the channel allocation states of the first and second devices are the left channel states ('L') as on the screen of operation 416 illustrated in FIG. 4, touches are input to the first and third devices.

In this case, on a screen of operation 432, the first device is changed back to the stereo state ('S') and the third device is allocated with the left channel and thus is changed into the left-channel state ('L'). In this state, if the user inputs the touch key input item "i" for confirmation of channel allocation, a screen of operation 434 is displayed.

The screen of operation 434 corresponds to the 2-channel allocation main screen like the screen of operation 432, on which indications indicating the second and third devices to which the left channel is currently allocated are included in the display region of the left-channel touch key input item g.

In FIG. 6, on a screen of operation 426 illustrated in FIG. 4, that is, on the 2-channel allocation main screen on which channel allocation states of the first and second devices are the left channel state ('L') and the right channel state ('R'), respectively, according to user's selection, for example, a touch is input to the touch key input item "f" for checking a list of all the devices included in the current group.

In this case, as shown on a screen of operation 440, indications indicating a list of all the devices included in the current group and a channel allocation state for each device are displayed.

FIG. 7 illustrates screens which are displayed if it is determined that the currently played sound source supports 5.1 channels after input of the touch key input item a provided in advance to perform the per-device channel allocation operation mode, as shown on the screen of operation 410 illustrated in FIG. 4 on which group's simultaneous playback of current audio content is performed.

In other words, the screen of operation 450 is a 5.1-channel allocation main screen, in an upper portion of which the touch key input item "d" for 5.1-channel allocation is activated and in a center portion of which the touch key input items 'Left', 'Surrounded Left', 'Woofer', 'Surrounded Right', and 'Right' are provided for 5.1-channel allocation. On the screen of operation 450, a scheme for per-device 5.1-channel allocation may be similar to selecting a corresponding touch key input item for each channel and allocating a channel for each device like in the manner illustrated in FIG. 4.

FIG. 8 illustrates a 5.1-channel allocation main screen which is displayed like the screen of operation 450 displayed in case of touch input of the touch key input item "d" for 5.1-channel allocation provided in advance in the upper portion of the screen of operation 412 illustrated in FIG. 4; in other words, the 2-channel allocation main screen. On the 5.1-channel allocation main screen, for example, if the user selects a touch key input item "k" provided in advance for left-channel allocation, a screen of operation 462 may be displayed. On the screen of operation 462, a list of devices included in the current group (and channel allocation states of the devices) are displayed as channel-selectable touch key input items, such that the user may select a desired device from among corresponding items and allocate the left channel to the selected device. On the screen of operation 462, among the devices included in the current group (first through fifth devices), for example, the first device and the second device are selected and allocated with the left channel. Thereafter, on the screen of operation 462, the channel allocation states of the selected first and second devices are the left-channel states ('L'). Likewise, channel allocation for each device may be performed for the other channels of the 5.1 channels.

FIG. 9 illustrates comparative examples of user interface screens in the master device and the channel-allocated device included in the group according to the present invention, in which screens displayed on the master device may be almost similar to those illustrated in FIG. 4. That is, in the master device, during music sharing as on the screen of operation 410, the 2-channel allocation main screen may be displayed like the screen of operation 412 by user's manipulation, after which as shown on a screen of operation 470, for example, the left channel may be allocated to the first device, and then as shown on a screen of operation 472, a 2-channel allocation main screen may be displayed in a state where the left channel is allocated to the first device.

On the other hand, in the channel-allocated device included in the group, for example, in the first device, if the screen of operation 412 is displayed in the master device, a screen of operation 480 is displayed to inform the user that the first device enters a per-channel allocation mode for each device with respect to a currently played sound source, through a proper message or an indication. To this end, the master device is configured to transmit in advance information regarding a corresponding operation state to the first device.

Thereafter, if the master device allocates the left channel to the first device on a screen of operation 470, the first device displays a screen of operation 482 to inform the user of a channel (that is, the left channel) currently allocated thereto through a proper message. In this case, a touch key input item "m" for receiving additional confirmation from the user may be provided, and if there is a touch input with respect to the item m from the user, the first device may operate in the left-channel state. On a screen of operation 434, the first device informs the user through a proper message that the first device currently operates in the left-channel state.

FIG. 10 illustrates examples of user interface screens for initiating a group's simultaneous playback during music file playback, in which as shown on the screen of operation 400, during playback of particular audio contents (that is, music files), group's simultaneous playback (music sharing) may be selected in a menu selection environment separately provided in advance.

In this case, the screen of operation 402 is displayed to inform the user of initiation of group's simultaneous playback of a currently played music file through a proper message. Thereafter, screens of operations 410 and 412, which are the same as those illustrated in FIG. 4, may operate in the same manner as in FIG. 4.

As described above, the audio content playback method for the portable terminal according to the present invention may provide group's simultaneous playback specialized or optimized for audio content, provide more pleasure to users in audio listening, and make it possible to selectively play audio content according to various schemes.

The present invention may be implemented according to various embodiments of the present invention, and other embodiments may also be implemented according to various modifications and changes of the present invention.

For example, in the foregoing embodiment, in general group's simultaneous playback of audio content and per-channel group's simultaneous playback for each device according to characteristics of the present invention, audio content playback for all devices included in a group may coincide with each other, but it may also be possible that in general group's simultaneous playback, sharing of audio content may be merely performed and coincidence of playback may not be performed. In per-channel group's simultaneous playback for each device, audio content may be transmitted in real-time streaming manner and playback for the devices may accurately coincide with each other.

In the foregoing description, if a channel is allocated to each device based on 2 channels or 5.1 channels, the left or right channel is first selected and then each device is selected. However, it is within the breadth of the invention that each device may be first selected and then one of multiple channels may be allocated to the selected device. For example, in a list item of devices, a selection item for allocation of the stereo channels, the left channel, and the right channel may be provided in advance.

The above-described methods according to the present invention can be implemented in hardware, firmware or via the execution of software or computer code that is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitutes hardware in the claimed invention. Under the broadest reasonable interpretation, the appended claims constitute statutory subject matter in compliance with 35 U.S.C. § 101 and none of the elements constitute software per se.

The terms "unit" or "module" as may be used herein is to be understood as constituting or operating in conjunction with hardware such as a circuit, processor or microprocessor configured for a certain desired functionality in accordance with statutory subject matter under 35 U.S.C. § 101 and such terms do not constitute software per se.

While the present invention has been particularly illustrated and described with reference to certain embodiments thereof, various modifications or changes can be made without departing from the scope of the present invention. Therefore, the scope of the present invention is not limited to the described embodiments, should be defined by the scope of the following claims and any equivalents thereof.

What is claimed is:

1. An audio content playback method for a portable terminal, the audio content playback method comprising:
   checking by a controller a group of devices engaged in simultaneous playback of the audio content;
   allocating by the controller a channel of audio to each of devices included in the group based on a position information of each device included in the group or based on an input state in a user interface environment that is preset for channel allocation for each device included in the group; and
   displaying channel allocation states for the devices included in the group.

2. The audio content playback method of claim 1, wherein displaying the channel allocation states for the devices included in the group comprises:
   separately displaying the devices included in the group corresponding to the allocated channel.

3. The audio content playback method of claim 2, wherein separately displaying the devices included in the group corresponding to the allocated channel comprises:
   displaying sub items for each channel; and
   displaying information of the devices currently allocated for each channel in the sub items.

4. The audio content playback method of claim 1, wherein the user interface environment that is preset for channel allocation for each device included in the group comprises:
   a plurality of menu selection items provided in advance to receive selection of a channel allocation scheme corresponding to a supportable channel of the audio content; and sub-menu selection items for selecting a channel for each device included in the group based on the supportable channel of the audio content.

5. The audio content playback method of claim 4, wherein information of the devices currently allocated for each channel is displayed on the sub-menu selection items.

6. The audio content playback method of claim 4, further comprising displaying on a channel allocation main screen the menu selection items provided in advance to receive selection of the channel allocation scheme corresponding to the supportable channel of the audio content are displayed, in which the channel allocation main screen that is provided in advance for each channel allocation scheme corresponds to the supportable channel of the audio content, and
additionally displaying on the channel allocation main screen:
a plurality of touch key input items provided in advance for each channel allocation scheme corresponding to the supportable channel of the audio content; and
touch key input items for checking a list of the devices included in the group and channel allocation states of the devices included in the group.

7. The audio content playback method of claim 6, wherein on the channel allocation main screen are additionally displayed touch key input items provided in advance for each channel as at least a part of the sub-menu selection items for selecting the channels for each device included in the group based on the supportable channel of the audio content.

8. The audio content playback method of claim 7, wherein, as a sub-menu of the touch key input item provided in advance for each channel, the list of the devices included in the group and channel allocation states of the devices are displayed as touch key input items.

9. The audio content playback method of claim 7, wherein additionally displaying on the channel allocation main screen a touch key input item provided in advance for automatic channel allocation.

10. The audio content playback method of claim 7, wherein the touch key input items provided in advance for each channel comprise 'Left' and 'Right' corresponding to 2 channels or 'Left', 'Surrounded Left', 'Woofer', 'Surrounded Right', and 'Right' corresponding to 5.1 channels.

11. A machine-readable non-transitory storage medium having recorded thereon a program that is executed by the controller to operate the audio content playback method of claim 1, wherein the controller is a controller of the portable terminal.

12. A portable terminal comprising:
a controller;
a mobile communication unit configured to perform a wireless signal processing operation for a mobile communication function;
an auxiliary communication unit for short-range communication with a group of devices;
an audio input/output unit receives an audible input, or outputs audible sound; and
a storage unit comprising having recorded thereon machine executable code that is executed by the controller for controlling playback of audio content playback operation by each device of the group of devices simultaneously,
wherein the controller checks the group of devices engaged in simultaneous playback of the audio content, allocates a channel of audio to each of devices included in the group based on a position information of each device included in the group or based on an input state in a user interface environment that is preset for channel allocation for each device included in the group; and displays channel allocation states for the devices included in the group.

13. The portable terminal of claim 12, wherein when the controller displays the channel allocation states for the devices included in the group, the controller separately displays the devices included in the group corresponding to the allocated channel.

14. The portable terminal of claim 13, wherein when the controller separately displays the devices included in the group corresponding to the allocated channel, the controller displays sub items for each channel and displays information of the devices currently allocated for each channel in the sub items.

15. The portable terminal of claim 12, wherein the user interface environment that is preset for channel allocation for each device included in the group comprises:
a plurality of menu selection items provided in advance to receive selection of a channel allocation scheme corresponding to a supportable channel of the audio content; and
sub-menu selection items for selecting a channel for each device included in the group based on the supportable channel of the audio content.

16. The portable terminal of claim 15, wherein information of the devices currently allocated for each channel is displayed on the sub-menu selection items.

17. The portable terminal of claim 15, the controller further displays on a channel allocation main screen the menu selection items provided in advance to receive selection of the channel allocation scheme corresponding to the supportable channel of the audio content are displayed, in which the channel allocation main screen that is provided in advance for each channel allocation scheme corresponds to the supportable channel of the audio content, and
additionally displays on the channel allocation main screen:
a plurality of touch key input items provided in advance for each channel allocation scheme corresponding to the supportable channel of the audio content; and
touch key input items for checking a list of the devices included in the group and channel allocation states of the devices included in the group.

18. The portable terminal of claim 17, wherein on the channel allocation main screen are additionally displayed touch key input items provided in advance for each channel as at least a part of the sub-menu selection items for selecting the channels for each device included in the group based on the supportable channel of the audio content.

19. The portable terminal of claim 18, wherein, as a sub-menu of the touch key input item provided in advance for each channel, the list of the devices included in the group and channel allocation states of the devices are displayed as touch key input items.

20. The portable terminal of claim 18, wherein a touch key input item provided in advance for automatic channel allocation is additionally displayed on the channel allocation main screen.

* * * * *